Sept. 16, 1958     M. W. MARIEN     2,852,324
FLUID CONTROL RING
Filed March 26, 1956
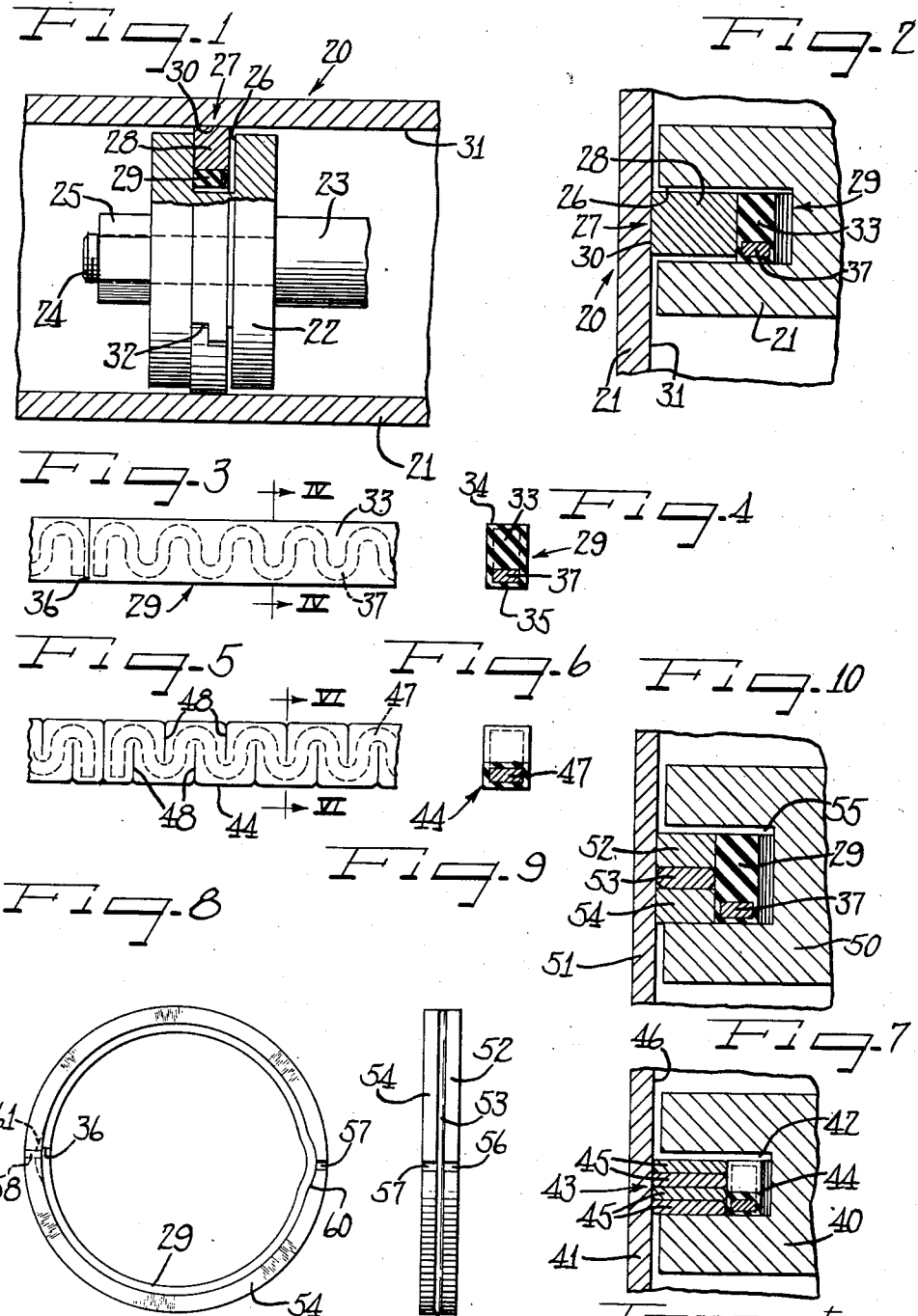
Inventor
Melvin W. Marien United States Patent Office 2,852,324
Patented Sept. 16, 1958

2,852,324

FLUID CONTROL RING

Melvin W. Marien, Brentwood, Mo., assignor to Ramsey Corporation, St. Louis, Mo., a corporation of Ohio Application March 26, 1956, Serial No. 573,855

11 Claims. (Cl. 309—43)

The present invention relates to a fluid control ring assembly, and more particularly relates to a control type ring assembly for a piston and cylinder to prevent flow of fluid and fluid pressure loss across the piston in the cylinder.

With even greater particularity, the present invention includes a fluid control ring assembly having as an element thereof a new and improved backing ring operable to exert a radial force and formed from an elastomer.

In piston and cylinder assemblies such as might be used in internal combustion engines as well as in hydraulic and pneumatic actuating devices etc., it is generally highly desirable to have some means in the assembly for preventing fluid flow and fluid pressure loss across the piston within the cylinder as the piston and cylinder relatively reciprocate. It has been found that one of the most convenient and most advantageous ways of controlling fluid pressure loss and/or fluid flow across the piston is through the utilization of a fluid control ring or fluid control ring assembly in one of the parts of the arrangement, that is, either in the cylinder to engage the piston or in the piston to engage the cylinder. In either event, the ring sits in a groove in one of the parts and engages the surface of the other of the parts as the parts relatively reciprocate to thereby block fluid communication between opposite ends of the cylinder from within the cylinder.

The most common form of arrangement is to provide a fluid control ring groove in the piston and seat a fluid control ring in the ring groove to ride on the cylinder surface with the piston.

While there have been numerous forms of fluid control rings and fluid control ring assemblies for this purpose, many of these have not enjoyed the success desired therefor for numerous reasons.

It is, therefore, an important object, feature and advantage of the present invention to provide a new and improved oil control ring assembly operable to minimize or prevent fluid flow across the piston as well as fluid pressure loss across the piston as the piston relatively reciprocates coaxially in the cylinder.

In accordance with this invention there is provided a new and improved fluid control ring assembly utilizing a cylinder wall engaging ring or a plurality thereof and a backing or expander ring of very new and much improved construction and characteristics. The backing ring or expander ring of this invention is formed from an elastomer and has included in the body thereof a corrugated resilient force-exerting member. This inner member in the elastomer body of the expander ring or backing ring may be formed of any suitable material but is preferably a resilient metal such as spring steel or the like. The backing ring is preferably formed by molding the elastomer about the corrugated resilient reinforcing and force-exerting member.

It is, therefore, another important object, feature and advantage of this invention to provide a new and improved fluid control ring assembly with a backing ring formed from an elastomer and having included therein a corrugated force exerting member.

Another object of the present invention is to provide a new and improved sealing ring assembly with an outer metallic ring and an elastomer covered circumferential, radial expander ring.

Still another object of the present invention is to provide a new and improved expander or backing ring formed from an elastomer and having a resilient expander ring embedded therein.

Still another object of the present invention is to provide a new and improved backing or expander ring formed from a metallic corrugated resilient expander molded into an elastomer ring.

Still another object of the present invention is to provide a new and improved backing or expander ring formed from a metallic corrugated resilient expander molded into an elastomer ring, the elastomer being selected from such a material as neoprene or silicone rubber.

Numerous other objects, features and advantages of the present invention will become readily apparent to those skilled in the art, and others, from the following detailed description of the present invention and embodiments thereof, from the claims, and from the accompanying drawings in which each and every detail shown is fully and completely disclosed as a part of this specification, in which like reference numerals refer to like parts, and in which:

Figure 1 is a fragmental partly sectional view of a piston and cylinder assembly utilizing a sealing ring or fluid control ring embodying the principles of this invention;

Figure 2 is an enlarged view of a portion of the assembly of Figure 1 showing the sealing ring in greater detail;

Figure 3 is a fragmental elevational view of a portion of an expander or backing ring in accordance with this invention;

Figure 4 is a sectional view of the ring of Figure 3 viewed as taken substantially along the line IV—IV of Figure 3;

Figure 5 is a fragmental view of another form of expander or backing ring embodying the principles of this invention;

Figure 6 is a sectional view of the ring of Figure 5 viewed as taken substantially along the line VI—VI of Figure 5;

Figure 7 is a view like Figure 2 utilizing the ring of Figures 5 and 6;

Figure 8 is a plan view of a ring assembly embodying the principles of this invention;

Figure 9 is a side view of the ring assembly of Figure 8; and

Figure 10 is a view like Figures 2 and 7 utilizing the ring assembly of Figures 8 and 9.

There is illustrated in Figures 1 and 2 a pistion and cylinder assembly 20 having a cylinder 21 and a reciprocable piston part 22 coaxially arranged therein for axial movement. The piston has a piston rod 23 connected thereto as by having a threaded end 24 thereof extend through the piston and secured by such convenient means as a nut 25. It will be understood, of course, that the piston and cylinder arrangement herein shown is merely exemplary and that fluid control ring assemblies in accordance with this invention may be utilized with any form of piston and cylinder assembly to prevent fluid flow and fluid pressure loss across the piston within the cylinder.

In the embodiment shown, however, the piston 22 is provided with a circumferential fluid control ring groove 26 in which the control ring assembly 27 is seated. This control ring assembly includes a sealing ring 28 and a backing ring or expander ring 29. The sealing ring 28 is preferably a metallic ring having good wear characteristics and may be formed of such material as chrome steel or have a chromium plated outer face 30 to engage the cylinder wall 31 of the cylinder 21. The particular sealing ring 28 is relatively wide, in an axial direction, but slightly smaller than the axial dimension of the ring groove 26 and is a split ring so that it may be expanded over the end of the cylinder and seated into the ring groove 26. The ring is also split so that it may be expanded into good interfacial engagement with the cylinder wall 31 of the cylinder 21 for sealing engagement therewith.

In the form of sealing ring shown in Figure 1, the ring is split by a stepped split 32 so as to provide a complete block against fluid flow across the ring yet permitting the ring to be expandable radially.

Expansion of the ring radially as the ring sits in the groove 26, is effected by the circumferential expander 29 which lies in interfacial engagement with the inner face or back of the sealing ring 28 and exerts a radial force thereon so that the backing ring 29 will expand the sealing ring into good interfacial engagement with the cylinder wall 31.

The details of this expander 29 are best understood with attention to Figures 2, 3 and 4. In these figures it is shown that the expander or backing ring 29 is formed from an elastomer molded into ring form thereby providing an elastomer body ring 33. This particular ring has smooth radial surfaces 34 and 35 which are continuous and unbroken except at the split 36, of Figure 3, in the ring providing abutting ends thereon. In its free state, there is a gap at the split 36, but when the expander ring is confined by the sealing or outer ring 28, the ends at the split 36 abut so as to produce a reactive force which causes sealing circumferential expansion of the outer ring and creates a seal against the leakage through the gap of the outer ring. The particular elastomer material from which the ring is formed is not critical so long as it has properties such that it will withstand deterioration from the fluid utilized in the piston and cylinder. Common proper materials for utilization in the ordinary piston and cylinder arrangement would be such materials as neoprene or silicone rubber. The expander ring 29 is so dimensioned that there is a back clearance between it and the bottom of the ring groove.

Within the elastomer body of the ring there is molded thereinto a corrugated formed stiffening, resilient and force-storing-and-exerting ring 37 which is corrugated in an axial direction and resilient and yieldable to provide the elastomer body and the entire backing ring with a radially exerted force for expanding the sealing ring 28. This reinforcing, resilient force-exerting ring 37 is dimensioned to have a width slightly less than the width of the elastomer body 33 of the backing ring or expander and a corrugation amplitude slightly less than the axial dimension of the elastomer body so that it, the reinforcing ring, will be fully enclosed by the molded elastomer. It is also slightly longer in free position so that it will be circumferentially compressed in operating position thereby providing radial forces against the outer rings. The material from which the corrugated ring is formed may be any desired material having the proper resiliency, the proper stiffening characteristics, and the proper force-exerting characteristics and a good example thereof would be spring steel. Thus the back of the expander ring is precluded from engaging the bottom of the ring groove.

Another form of backing or expander ring embodying the principles of this invention is illustrated in Figures 5 and 6 and further illustrated in Figure 7 in combination with a sealing ring to form a complete fluid control ring assembly in the ring groove of a piston in the cylinder. Referring first to Figure 7, the piston 40 is reciprocably disposed in the cylinder 41 and is circumferentially grooved as at 42 to loosely receive a sealing ring assembly or fluid control ring assembly 43. The sealing ring assembly 43 includes a backing or expander ring 44 which backs and circumferentially expands or radially expands split thin rail sealing rings 45—45. These thin split rail rings are formed of a material or plated etc. substantially the same as the sealing ring 28 but are split with straight axial splits. By providing a plurality of such rings in the groove and offsetting the splits therein, sealing against oil flow or other fluid flow through the splits in the ring is conveniently effected.

The backing ring 44 abuts the inner radial edges or backs of each of the split rail rings 45—45 and circumferentially or radially expands the same by exerting the force there-against so that the outer edges or faces of the rail rings engage the face 46 of the cylinder in the desired manner and with the desired pressure.

The expander or backing ring 44 is formed in much the same manner as the backing ring or expander 29 in that it is molded from an elastomer such as neoprene or silicone rubber or other desired elastomer with a stiffening, resilient force-exerting member 47 therein. Like the stiffening, resilient and force-exerting member 47, the member 47 is corrugated and formed from a strip having a width slightly less than the width of the molded elastomer body of the ring and a corrugation amplitude less than the axial dimension or height of the molded elastomer body.

To further provide for resilient expansion of the backing ring, the elastomer body is either molded in a corrugated like form corresponding to the corrugation form of the stiffening and force-exerting strip 47, which may be made of spring steel or any other similar property desired material, or the body may be cut part way through the axial dimension thereof between the corrugations of the reinforcing strip to be expandable. In Figure 5 it is shown that the cuts 48—48 are provided in the elastomer body of the strip to extend from the radial surfaces thereof inwardly in an axial direction of the strip corresponding to the position of the corrugations in the strip 47 to positions near the negative curved portions of the corrugations in the strip 47. This permits still greater expandability for the expander or backing ring.

Among the numerous other advantages of the instant invention, backing and expander rings in accordance herewith are also operable to lock the sealing rings in place with respect to each other when a plurality thereof are used together as in Figures 7 and 10. This advantage and the operating characteristics of the rings to effect this purpose are best understood with a particular reference to Figures 8, 9 and 10. In Figure 10 it is shown that a backing ring which is the same as backing ring 29 and therefore identically numeralled, is utilizable in an assembly of a piston 50 and cylinder 51 to back-up, and expand, a plurality of coaxially arranged sealing rings 52, 53 and 54 in the groove 55 in the piston 50. The rings 52, 53 and 54 herein provided are so arranged that the rings 52 and 54, the two axially outer rings, are of the same size and configuration and are relatively heavy or axially wide rings while the center or intermediate ring 53 is a relatively narrow ring such as a thin split rail ring. All of these rings are split to accommodate placement thereof within the ring groove and to further accommodate radial expansion thereof.

If all of the gaps of these rings were aligned then fluid could easily pass across the ring and fluid pressure drops and fluid pressure losses could easily occur across the ring. To prevent such fluid pressure loss and fluid loss across the piston, however, these rings are preferably disposed with the gaps thereof misaligned and even possibly diametrically opposed as between adjacent ones thereof. Attention, therefore, is invited to Figures 8 and 9 wherein it is shown that the outer rings 52 and 54 may have aligned gaps 56 and 57 therein while the intermediate ring, 53, has its gap 58 diametrically opposed from the gaps 56 and 57 in the outer rings 52 and 54.

To lock these sealing rings in position with the gaps thereof in the positions described therefor, the inner axial faces of the rings are slightly indented or machined down in the region of the gaps therein as at 60 for the outer rings 52 and 54 and as at 61 for the intermediate ring 53. Since the backing ring 29 is formed from the force-exerting elastomer molded body, it will expand into the indentations or machined away portions 60 and 61 and effectively operate as a key in slot or keyway and lock the sealing rings in position with the slots therein misaligned or opposed thereby preventing fluid leakage or fluid pressure losses across.

It will be fully understood, of course, that any of the backing or expander rings described herein are utilizable with any of the sealing rings described herein in combination therewith and that any of the groups of sealing rings may be indented or machined away as described in conjunction with Figures 8, 9 and 10 and be cooperatively arranged with any of the backing or expander rings described to lock the sealing rings in position with the slots thereof opposed or at least misaligned.

It will also be understood that numerous variations and modifications may be effected without departing from the true spirit and scope of the novel concepts and principles of this invention and that I, therefore, intend to cover all such modifications and variations as fall within the true spirit and scope of the novel concepts and principles of this invention.

I claim as my invention:

1. A fluid control ring assembly, for a ring groove in a part of a piston and cylinder assembly having a piston part and a cylinder part, for preventing flow of fluid and fluid pressure loss across the piston, comprising: a first split ring in the ring groove in one of the parts of said piston and cylinder assembly and engaging the other of the parts thereof; and a backing ring disposed deeper in said groove than said first ring, and having back clearance with said groove, said backing ring being in peripheral engagement with said first ring and confined thereby, and operative to exert a reactive force on said first ring effective to urge said first ring into peripheral sealing engagement with the other of the parts of the piston and cylinder assembly, said backing ring including a resilient band formed from an elastomer and a corrugated strip of stiffening and force-storing-and-exerting material incorporated within the body of said band, said backing ring sealing the gap in said split ring.

2. A fluid control ring assembly, for a ring groove in a part of a piston and cylinder assembly having a piston part and a cylinder part, for preventing flow of fluid and fluid pressure loss across the piston, comprising: a first split ring in the ring groove in one of the parts of said piston and cylinder assembly and engaging the other of the parts thereof; and a corrugated backing ring disposed deeper in said groove than said first ring, and having back clearance with said groove, said backing ring being in peripheral engagement with said first ring and confined thereby, and operative to exert a reactive force on said first ring effective to urge said first ring into peripheral sealing engagement with the other of the parts of the piston and cylinder assembly, said corrugated ring including a resilient corrugated band from an elastomer and a corrugated strip of stiffening and force-storing and exerting material incorporated within the body of said band, said backing ring sealing the gap in said split ring.

3. A fluid control ring assembly, for a ring groove in a part of a piston and cylinder assembly having a piston part and a cylinder part, for preventing flow of fluid and fluid pressure loss across the piston, comprising: a split ring in the ring groove in one of the parts of said piston and cylinder assembly and engaging the other of the parts thereof; and a backing ring disposed deeper in said groove than said split ring, and having back clearance with said groove, said backing ring being in peripheral engagement with said split ring and confined thereby, and operative to exert a reactive force on said split ring effective to urge said split ring into peripheral sealing engagement with the other of the parts of the piston and cylinder assembly, said backing ring including a resilient band having smooth radial surfaces and formed from an elastomer and a corrugated strip of stiffening and force-storing-and-exerting material incorporated within the body of said band, said backing ring sealing the gap in said split ring and one of said radial surfaces sealably engaging with a side of the ring groove.

4. A fluid control ring assembly for a ring groove in a part of a piston and cylinder assembly having a piston part and a cylinder part, for preventing flow of fluid and fluid pressure loss across the piston, comprising: a plurality of coaxial split rings, the axial outer of which are of greater axial dimension than an axial intermediate one thereof, said rings being disposed in the ring groove in one of the parts of said piston and cylinder assembly and engaging the other of the parts thereof; and a backing ring disposed deeper in said groove than said split rings and having back clearance with said groove, said backing ring being in peripheral engagement with said split rings and confined thereby, and operative to exert a reactive force on said split rings effective to urge said split rings into peripheral sealing engagement with the other of the parts of the piston and cylinder assembly, said backing ring including a resilient band formed from an elastomer and a corrugated strip of stiffening and force-storing-and-exerting material incorporated within the body of said band, said backing ring sealing said gaps in said split rings.

5. In a fluid control ring assembly for preventing fluid leakage and pressure loss across a piston in a piston and cylinder assembly, a backing band formed from an elastomer, and a corrugated strip of stiffening and force-storing-and-exerting material incorporated within the body of said band, whereby when said band is confined in the assembly, said material produces a reactive force.

6. In a fluid control ring assembly for preventing fluid leakage and pressure loss across a piston in a piston and cylinder assembly, said ring assembly including a split ring having a gap, the improvement comprising: a corrugated backing band formed from an elastomer, and a corrugated strip of stiffening and force-storing-and-exerting material incorporated within the body of said band for biasing said band sealingly against the split ring gap.

7. In a piston and cylinder assembly having a ring groove, a fluid control ring assembly for the groove to prevent fluid leakage and pressure loss across the piston, the improvement comprising: a backing band having smooth radial sealing surfaces formed from an elastomer, and a corrugated strip of stiffening and force-storing-and-exerting material incorporated within the body of said band, whereby when said strip is confined in the assembly, said strip produces a reactive force and sealingly engages one side of the groove.

8. A fluid control ring assembly to prevent fluid leakage and pressure loss across a piston in a piston and cylinder assembly, comprising: a split sealing ring, and a backing ring in peripheral engagement therewith and yieldably confined thereby, and operative to exert a radial reactive force on said split sealing ring, said backing ring being formed from an elastomer, and a corrugated strip of stiffening and force-storing-and-exerting material incorporated within the body of said band, said backing ring sealing the gap in said split ring.

9. A fluid control ring assembly, for a ring groove in a part of a piston and cylinder assembly having a piston part and a cylinder part, for preventing flow of fluid and fluid pressure loss across the piston, comprising: a first split ring in the ring groove in one of the parts of said piston and cylinder assembly and engaging the other of the parts thereof; and a backing ring disposed deeper in said groove than said first ring, and having back clearance with said groove, said backing ring being in peripheral engagement with said split ring and confined thereby, and operative to exert a reactive force on said first ring effective to urge said first ring into peripheral sealing engagement with the other of the parts of the piston and cylinder assembly, said backing ring including a resilient band formed from an elastomer and a strip of yieldable resilient material incorporated within the body of said band, said backing ring sealing the gap in said split ring.

10. In a fluid control ring assembly, for preventing fluid leakage and pressure loss across a piston in a piston and cylinder assembly, said assembly including a split ring having a gap, the improvement comprising: a corrugated sealing and backing band formed from an elastomer, and a corrugated strip of resilient material incorporated within the body of said band for biasing said band sealingly against the split ring gap.

11. In a fluid control ring assembly, for preventing fluid leakage and pressure loss across a piston in a piston and cylinder assembly, the improvement comprising: a sealing backing band formed from an elastomer, and a strip of yieldable resilient material incorporated within said body of said band for providing a reactive sealing force to said band when said band is confined.

References Cited in the file of this patent

UNITED STATES PATENTS

| | | |
|---|---|---|
| 1,596,353 | Hartman | Aug. 17, 1926 |
| 2,231,690 | Sheldrick | Feb. 11, 1941 |
| 2,293,450 | Wilkening | Aug. 18, 1942 |
| 2,456,529 | Naab | Dec. 14, 1948 |
| 2,466,428 | Hufferd | Apr. 5, 1949 |
| 2,661,182 | Kipp | Dec. 1, 1953 |